(12) United States Patent
Satou et al.

(10) Patent No.: US 8,945,713 B2
(45) Date of Patent: Feb. 3, 2015

(54) GLASS MATERIAL FOR PRESS MOLDING, METHOD FOR MANUFACTURING OPTICAL GLASS ELEMENT EMPLOYING SAME, AND OPTICAL GLASS ELEMENT

(75) Inventors: Kouichi Satou, Shinjuku-ku (JP); Yuuichi Tokunaga, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/321,664

(22) PCT Filed: May 19, 2010

(86) PCT No.: PCT/JP2010/058457
§ 371 (c)(1),
(2), (4) Date: Feb. 8, 2012

(87) PCT Pub. No.: WO2010/134546
PCT Pub. Date: Nov. 25, 2010

(65) Prior Publication Data
US 2012/0135199 A1    May 31, 2012

(30) Foreign Application Priority Data
May 20, 2009 (JP) ................................. 2009-122404

(51) Int. Cl.
*B32B 17/06* (2006.01)
*B32B 17/00* (2006.01)
(Continued)

(52) U.S. Cl.
CPC . *G02B 3/04* (2013.01); *C03B 11/08* (2013.01); *C03C 3/068* (2013.01);
(Continued)

(58) Field of Classification Search
USPC ......... 428/426, 427, 428, 432, 698, 699, 701, 428/702, 704, 212, 213, 215, 220, 697
See application file for complete search history.

(56) References Cited

U.S. PATENT DOCUMENTS 5,201,927 A    4/1993    Nakamura et al.

5,843,200 A *  12/1998   Richards .................. 65/102
2007/0232477 A1  10/2007 Fujiwara

FOREIGN PATENT DOCUMENTS

JP    62-202824 A    9/1987
JP    7-118025 A     5/1995
(Continued)

OTHER PUBLICATIONS

Machine translation of JP 2007-269544 A, publ. date Oct. 18, 2007.*
(Continued)

*Primary Examiner* — Maria Veronica Ewald
*Assistant Examiner* — Joanna Pleszczynska
(74) *Attorney, Agent, or Firm* — Sughrue Mion, PLLC

(57) ABSTRACT

Disclosed is a glass material for press forming providing an optical element having a sufficient optical performance without surface cracks, cloudiness, scratches, and the like even when the glass material contains an easily reducible component. Also disclosed are an optical element having a sufficient optical performance without surface cracks, cloudiness, scratches, and the like and a method for manufacturing the same. Specifically disclosed are a glass material for press forming and a glass optical element each of which comprises a core portion composed of multiple component optical glass and a composite surface layer covering at least a region serving as an optical functional surface of the core portion. The core portion is composed of optical glass that contains an easily reducible component and does not contain Pb. The composite surface layer includes a first surface layer that covers the core portion and a second surface layer that covers the first surface layer. The first surface layer is composed of a component that does not react with the glass of the core portion at the press forming temperature and does not diffuse in the glass of the core portion. The second surface layer is composed of a component that improves formability during the press forming. Also specifically disclosed is a method for manufacturing the optical element.

3 Claims, 2 Drawing Sheets

(51) Int. Cl.
*G02B 1/00* (2006.01)
*G02B 3/04* (2006.01)
*C03B 11/08* (2006.01)
*C03C 3/068* (2006.01)
*C03C 3/21* (2006.01)
*C03C 17/34* (2006.01)

(52) U.S. Cl.
CPC ............... *C03C 3/21* (2013.01); *C03C 17/3417* (2013.01)
USPC ........... 428/426; 428/212; 428/213; 428/220; 428/432; 428/698; 428/699; 428/701; 428/702; 428/704

(56) References Cited

FOREIGN PATENT DOCUMENTS

| | | |
|---|---|---|
| JP | 8-217466 A | 8/1996 |
| JP | 08-277125 A | 10/1996 |
| JP | 2004-250295 A | 9/2004 |
| JP | 2006-016286 A | 1/2006 |
| JP | 2007118025 A | 5/2007 |
| JP | 2007-261877 A | 10/2007 |
| JP | 2007-269544 A | 10/2007 |
| JP | 2007-269613 A | 10/2007 |
| WO | 2007114170 A1 | 10/2007 |

OTHER PUBLICATIONS

Machine translation of JP 08-277125, publ. date Oct. 22, 1996.*
Chinese Office Action corresponding to Chinese Patent Application No. 201080021918.4, dated Oct. 10, 2012.
Office Action issued in corresponding Japanese Patent Application No. 2012-061406 dated Dec. 24, 2013.
Communication dated Jun. 19, 2014, issued by the State Intellectual Property Office of the People's Republic of China in corresponding Application No. 201210272829.8.

* cited by examiner

GLASS MATERIAL FOR PRESS MOLDING, METHOD FOR MANUFACTURING OPTICAL GLASS ELEMENT EMPLOYING SAME, AND OPTICAL GLASS ELEMENT

CROSS-REFERENCE TO RELATED PATENT APPLICATIONS

The present invention claims priority under Japanese Patent Application 2009-122404 filed on May 20, 2009, the entire contents of which are hereby incorporated by reference.

TECHNICAL FIELD

The present invention relates to a glass material used for obtaining optical glass elements by precision press molding, to a method for manufacturing optical elements using the glass material, and to an optical glass element obtained by the manufacturing method.

More particularly, although the present invention employs a glass material comprising components that are highly reactive with the molding surfaces of the pressing mold at elevated temperatures during press molding, the present invention suppresses the reaction of these components with the molding surfaces, and can be primarily applied to stably and efficiently produce optical elements of adequate optical performance while preventing fusion, clouding, scratches, and other reaction traces on the surface of the molded article, thereby extending the service life of the pressing mold.

BACKGROUND ART

It is known that a glass material that has been softened by heating can be press molded with a pressing mold to transfer the shape of the molding surface to the glass material, thereby producing an optical element such as a glass lens. The optically functional surfaces of an optical element that has been formed by press molding possess the desired optical performance without being subjected to mechanical processing such as polishing.

Patent Reference 1 discloses a method of manufacturing pressed lenses by placing a glass material (preform), the surface of which has been coated with a silicon oxide film, in a pressing mold, and press molding the glass material at a temperature at which it is in a softened state. This method is described as preventing fusion of the mold and glass during press molding, and preventing the precipitation of reduced particles due to reduction of PbO contained in the glass. According to the invention described in Patent Reference 1, the practical range of the thickness of the silicon oxide film is 50 to 2,000 Angstroms (5 to 200 nm). At below 50 Angstroms (5 nm), the effect of silicon oxide film formation is not achieved, and at greater than 2,000 Angstroms, defects such as cracks tend to occur during press molding, compromising optical qualities such as transmittance and the refractive index.

Patent Reference 2 discloses a method for molding optical glass elements by forming a thin layer comprised primarily of $SiO_2$ in the center portion of the surface of a glass element in advance, and placing the glass material in a pressing mold and conducting press molding. This method is considered to yield an optical element having an optically functional surface such that the occurrence of surface cracks is avoided and no clouding is generated in the center portion. According to the invention described in Patent Reference 2, the thickness of the thin film comprised principally of $SiO_2$ is 100 to 200 Angstroms. At below 100 Angstroms (10 nm), there is no cloud-preventing effect, and outer layer cracking occurs at 200 Angstroms and above.

Patent Reference 3 discloses an optical element in which a double outer surface layer is formed on the outer surface of a preformed glass core, with a first outer surface layer closer to the glass core being formed as a film on the outer surface of the glass core at a temperature at or above the glass transition temperature with the glass core material in a state of reduced pressure, and a second outer surface layer farther from the glass core being formed as a film on the first outer surface layer by sputtering or the like a glass material for vapor deposition. Patent Reference 3 also discloses a method for manufacturing the optical element. The glass material for vapor deposition that is used to form the second outer surface layer is a glass material comprising $SiO_2$, $Na_2O$, $Al_2O_3$, and $B_2O_3$. According to the invention, even when highly reactive glasses and glasses having readily volatizing glass components are employed as the glass material, it is possible to obtain an optical element without the occurrence of surface cracking that is free of fusion and clouding. According to the invention described in Patent Reference 3, the second outer surface layer comprised principally of $SiO_2$ is 5 to 50 nm in thickness. At less than 5 nm, the fusion-preventing effect (between mold and glass) was found to decrease, and at 50 nm and above, cracking occurred.

PRIOR ART REFERENCES

Patent References

[Patent Reference 1] Japanese Examined Patent Publication (KOKOKU) Heisei No. 2-1779
[Patent Reference 2] Japanese Unexamined Patent Publication (KOKAI) Heisei No. 7-118025
[Patent Reference 3] Japanese Unexamined Patent Publication (KOKAI) Heisei No. 8-198631

The contents of Patent References 1 to 3 are hereby incorporated in their entirety by reference.

SUMMARY OF THE INVENTION

Problem to be Solved by the Invention

In recent years, there has been a call to achieve greater compactness and reduce weight while maintaining high quality in image pickup devices typified by digital cameras and portable terminal devices with cameras. To a certain degree, it is possible to achieve optical devices that are more compact and lightweight by reducing the number of lenses in optical systems employing aspherical lenses. However, achieving further compactness will require improvement in the various lenses employed in optical systems. Accordingly, high refractive index glass is suitable as the optical glass material for fabricating the optical lenses that are mounted in such image pickup devices. The incorporation of any of the components W, Ti, Bi, and Nb into an optical glass material is known to raise the refractive index.

However, W, Ti, Bi, and Nb are readily reducing components that can assume multiple valences when present as glass components, and thus tend to undergo an oxidation/reduction reaction when employing an optical glass material comprising these components to manufacture an aspherical optical lens by press molding. In the press molding process, they have been discovered to produce various interface reactions in the process of deformation as pressure is applied by the pressing mold, fusing to the pressing mold. They also cause clouding and leave reaction traces such as scratching on the surface of the molded glass article. Still further, the molding surface is rendered rough by fusion, so that when transferred, irregularities occur on the surface of the molded article, tending to cause clouding.

According to research conducted by the present inventors, it has been discovered that even when employing the glass materials having thin films of silicon oxide or the like that are described in Patent References 1 to 3, cracking occurs in the glass film following press molding, and as a result, the glass core flowing out through these cracks tends to fuse to the pressing mold, making it impossible to obtain optical components with adequate optical performance or good external appearance with glasses comprising any of the reducing components W, Ti, Bi, and Nb.

The present invention, devised in light of the above circumstances, has for its object to provide a glass material for press molding that provides an optical element with adequate optical performance without surface cracking, clouding, scratching, or the like, and suppresses undesirable interface reactions such as fusion between the mold and the glass during press molding even when employing glass materials comprising any of the readily reducing components W, Ti, Bi, and Nb in the manufacturing of an optical element by press molding a glass material comprised of an optical glass. A further object of the present invention is to provide an optical element, and manufacturing method for the same, having adequate optical performance without surface cracking, clouding, scratching, or the like, that is manufactured from the glass material for press molding.

Means of Solving the Problem

The present invention achieving the above objects is as set forth below.

[1]

A glass material for press molding, having a core member comprised of an optical glass with a multiple component system, and a compound outer surface layer covering at least an area of the core member that becomes an optically functional surface, characterized in that:

the core member comprises optical glass comprising at least one readily reducing component selected from among W, Ti, Bi, and Nb, and not comprising Pb;

the compound outer surface layer comprises a first outer surface layer covering the core member and a second outer surface layer covering the first outer surface layer;

the first outer surface layer is comprised of components that do not react with the glass of the core member and do not diffuse into the glass of the core member at press molding temperatures; and the second outer surface layer is comprised of components that enhance moldability during press molding.

[2]

The glass material for press molding described in [1], characterized in that the first outer surface layer comprises one or more metal oxides selected from among $ZrO_2$, $Y_2O_3$, $Sc_2O_3$, and $Ln_2O_3$ (lanthanide series oxides) or a noble metal.

[3]

The glass material for press molding described in [1] or [2], characterized in that the second outer surface layer is comprised of one or more members of carbon (C) and an oxide, fluoride, or nitride of silicon (Si), aluminum (Al), zinc (Zn), tin (Sn), hafnium (Hf), boron (B), or magnesium (Mg).

[4]

The glass material for press molding described in any one of [1] to [3], characterized in that the first outer surface layer is not less than 1 nm but not more than 15 nm in thickness.

[5]

The glass material for press molding described in any one of [1] to [4], characterized in that the second outer surface layer is not less than 1 nm but not more than 15 nm in thickness.

[6]

The glass material for press molding described in any one of [1] to [5], characterized in that the core member is an optical glass comprising, denoted as mole percentages: 10 to 45% $P_2O_5$, 3 to 35% $Nb_2O_5$, 0 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; 0 to 15% $SiO_2$; wherein the combined quantity of $WO_3$, $TiO_2$, $Bi_2O_3$, and $Nb_2O_5$ is not less than 10% but less than 65%, and 0 to 10% of F relative to the total quantity of oxygen.

[7]

The glass material for press molding described in any one of [1] to [5], characterized in that the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 24% $TiO_2$; 0 to 20% $Bi_2O_3$; 0 to 15% $ZrO_2$; 0 to 20% $Ta_2O_5$; and 0 to 10% $GeO_2$; wherein the combined quantity of $WO_3$, $TiO_2$, $Bi_2O_3$, and $Nb_2O_5$ is 0.1 to 25%; and 0 to 10% of F relative to the total quantity of oxygen.

[8]

The glass material for press molding described in any one of [1] to [7], characterized in that the glass material has a shape similar to the molded glass article obtained by press molding.

[9]

The glass material for press molding described in [8], characterized in that the material having a shape similar to the molded glass article has a shape with a rate of change in center thickness due to press molding of 50% or less and a rate of change in outside diameter of 50% or less.

[10]

A method for manufacturing an optical glass element by heating the glass material described in any one of [1] to [9] and press molding the softened glass material in a pressing mold to obtain an optical glass element.

[11]

The method for manufacturing an optical glass element described in [10] wherein the pressing mold has a carbon-containing mold release film on the molding surface thereof.

[12]

A press molded optical glass element, characterized:

in that a glass material for press molding comprises a core member comprised of an optical glass with a multiple component system and a compound outer surface layer covering at least an area of the core member that becomes an optically functional surface;

in that the core member is comprised of an optical glass comprising at least one readily reducing component from among W, Ti, Bi, and Nb and not comprising Pb;

in that the compound outer surface layer comprises a first outer surface layer covering the core member and a second outer surface layer covering the first outer surface layer;

in that the first outer surface layer comprises a component that does not react with the core member glass and does not diffuse into the core member; and in that the second outer surface layer comprises a component that enhances the moldability during press molding.

[13]

The optical glass element described in [12], characterized in that the first outer surface layer comprises one or more metal oxides from among $ZrO_2$, $Y_2O_3$, $Sc_2O_3$, and $Ln_2O_3$ (lanthanide series oxides), or a noble metal.

[14]

The optical glass element described in [12] or [13], characterized in that the second outer surface layer is comprised of one or more members of carbon (C) and an oxide, fluoride, or nitride of silicon (Si), aluminum (Al), zinc (Zn), tin (Sn), hafnium (Hf), boron (B), or magnesium (Mg).

[15]

The optical glass element described in any one of [12] to [14], characterized in that the core member is an optical glass comprising, denoted as mole percentages: 10 to 45% $P_2O_5$, 3 to 35% $Nb_2O_5$, 0 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; 0 to 15% $SiO_2$; wherein the combined quantity of $WO_3$, $TiO_2$, $Bi_2O_3$, and $Nb_2O_5$ is not less than 10% but less than 65%, and 0 to 10% of F relative to the total quantity of oxygen.

[16]

The optical glass element described in any one of [12] to [14], characterized in that the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 24% $TiO_2$; 0 to 20% $Bi_2O_3$; 0 to 15% $ZrO_2$; 0 to 20% $Ta_2O_5$; and 0 to 10% $GeO_2$; wherein the combined quantity of $WO_3$, $TiO_2$, $Bi_2O_3$, and $Nb_2O_5$ is 0.1 to 25%; and 0 to 10% of F relative to the total quantity of oxygen.

Effect of the Invention

The present invention permits the manufacturing of an optical element affording high-quality optical performance without the occurrence of surface cracking, clouding, scratching, and the like by eliminating the occurrence of a reaction due to contact between the core member and the pressing mold by conducting molding with a compound outer surface layer comprised of a first outer surface layer and a second outer surface layer positioned between the core member and the pressing mold, and by conducting smooth molding resulting from the first outer surface layer blocking migration of readily reducing components from the core member to the outer surface side and the second outer surface layer enhancing moldability during press molding.

THE GLASS MATERIAL FOR PRESS MOLDING

Figure 1:
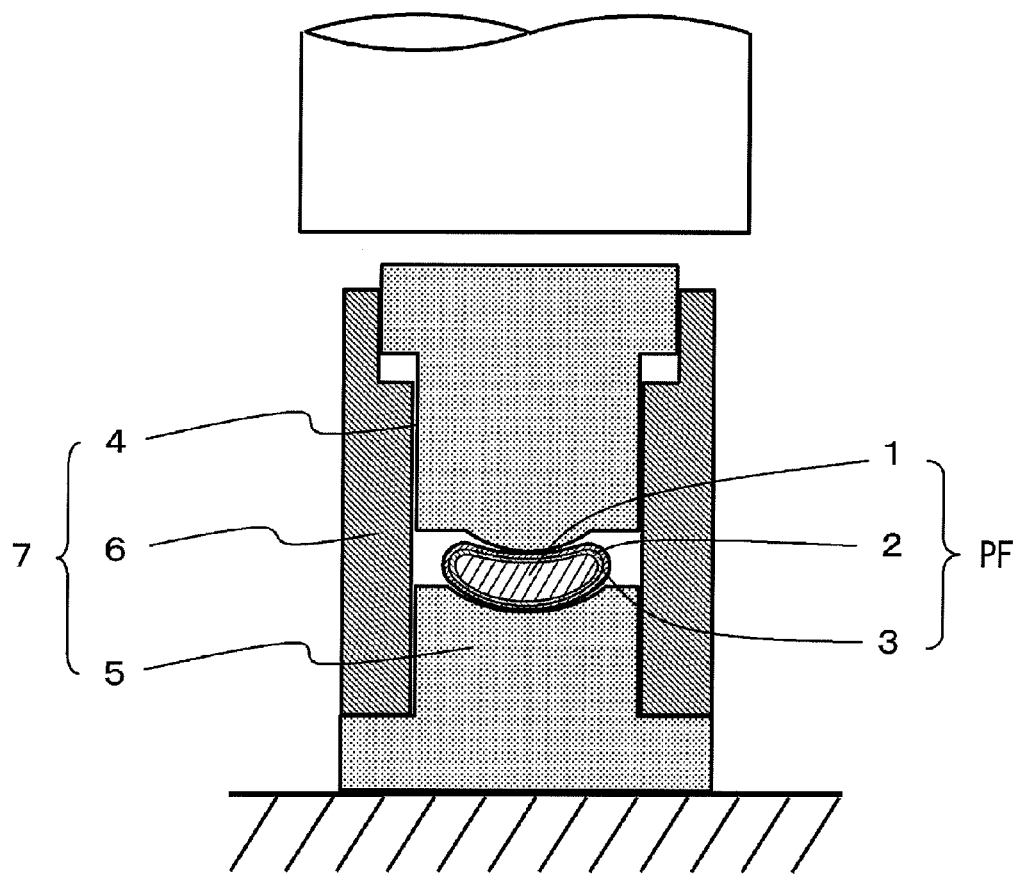
FIG. 1 A sectional view showing a mode of the glass material of the present invention in the course of press molding.

The glass material for press molding of the present invention has a core member comprised of an optical glass with a multiple component system, and a compound outer surface layer covering at least an area of the core member that becomes an optically functional surface.

Additionally, it is characterized in that:

the core member comprises an optical glass comprising at least one readily reducing component selected from among W, Ti, Bi, and Nb, and not comprising Pb;

the compound outer surface layer comprises a first outer surface layer covering the core member and a second outer surface layer covering the first outer surface layer;

the first outer surface layer is comprised of components that do not react with the glass of the core member and do not diffuse into the glass of the core member at press molding temperatures; and the second outer surface layer is comprised of components that enhance moldability during press molding.

Press molding the glass material of the present invention permits the manufacturing of an optical element affording high-quality optical performance without the occurrence of surface cracking, clouding, scratching, and the like by eliminating the occurrence of a reaction due to contact between the core member and the pressing mold by conducting molding with a compound outer surface layer comprised of a first outer surface layer and a second outer surface layer positioned between the core member and the pressing mold, and by conducting smooth molding resulting from the first outer surface layer blocking migration of readily reducing components from the core member to the outer surface side and the second outer surface layer enhancing moldability during press molding.

The optical glass with a multiple component system that becomes the core member in the optical glass component of the present invention is an optical glass comprising at least one readily reducing component from among W, Ti, Bi, and Nb, and not comprising Pb. The present invention is effective for optical glasses comprising readily reducing components that tend to undergo interface reactions with the molding press during press molding. These readily reducing components are incorporated to achieve high refractive index characteristics. However, when such an optical glass is subjected to press molding, scratches tend to appear on the lens surface and foaming tends to occur. This has been attributed to a reaction occurring at the interface with the pressing mold during the molding step because of the readily reducing property of the above components.

Accordingly, in the manufacturing of optical glasses that are relatively difficult to press mold, the present inventors prepared a glass material PF for press molding (also referred to simply as a glass material hereinafter) in which a first outer surface layer 2, comprised of components ($ZrO_2$, $Y_2O_3$, and the like) that did not react with the glass of the core component at press molding temperature and did not diffuse into the glass of the core member, were coated on the surface of a core member 1 comprised of an optical glass with a multiple component system, such as that shown in FIG. 1, and a second outer surface layer 3 (such as $SiO_2$ or $Al_2O_3$) that enhanced moldability during press molding was coated on first outer surface layer 2, and attempted press molding with a pressing mold 7 using this glass material PF.

The optical glass with a multiple component system—the glass of Embodiment 1 which comprised at least one readily reducing component from among W, Ti, Bi, and Nb—was used to prepare multiple preformed core members 1 (preformed material) in a convexoconcave shape similar to that of the targeted optical lenses.

Next, the core member 1 of each of the lenses was coated by sputtering with a first outer surface layer and a second outer surface layer in the 35 combination patterns shown in Table 1. Here, $ZrO_2$ was employed as the first outer surface layer formed on the outer surface of core member 1, and $SiO_2$ was employed as the second outer surface layer formed over outer surface layer 1.

TABLE 1

| Pattern | 1 | 2 | 3 | 4 | 5 | 6 | 7 | 8 | 9 | 10 | 11 | 12 |
|---|---|---|---|---|---|---|---|---|---|---|---|---|
| Film thickness of first outer surface layer ($ZrO_2$) Unit: nm | 0 | 0 | 0 | 0 | 0 | 2 | 2 | 2 | 2 | 2 | 2 | 5 |
| Film thickness of second outer surface layer ($SiO_2$) Unit: nm | 2 | 5 | 10 | 15 | 20 | 0 | 2 | 5 | 10 | 15 | 20 | 0 |
| Evaluation results | B | B | C | C | C | C | A | A | A | A | B | C |

| Pattern | 13 | 14 | 15 | 16 | 17 | 18 | 19 | 20 | 21 | 22 | 23 | 24 |
|---|---|---|---|---|---|---|---|---|---|---|---|---|
| Film thickness of first outer surface layer ($ZrO_2$) Unit: nm | 5 | 5 | 5 | 5 | 5 | 10 | 10 | 10 | 10 | 10 | 10 | 15 |
| Film thickness of second outer surface layer ($SiO_2$) Unit: nm | 2 | 5 | 10 | 15 | 20 | 0 | 2 | 5 | 10 | 15 | 20 | 0 |
| Evaluation results | A | A | A | A | B | C | A | A | A | A | B | C |

| Pattern | 25 | 26 | 27 | 28 | 29 | 30 | 31 | 32 | 33 | 34 | 35 |
|---|---|---|---|---|---|---|---|---|---|---|---|
| Film thickness of first outer surface layer ($ZrO_2$) Unit: nm | 15 | 15 | 15 | 15 | 20 | 20 | 20 | 20 | 20 | 20 | 20 |
| Film thickness of second outer surface layer ($SiO_2$) Unit: nm | 2 | 5 | 10 | 15 | 20 | 0 | 2 | 5 | 10 | 15 | 20 |
| Evaluation results | A | A | A | A | B | C | B | B | B | C | C |

As shown in Table 1, patterns 1 to 35 consisted of glass materials PF on which were formed outer surface layers in the form of combinations of first outer surface layers ($ZrO_2$) of 0 nm, 2 nm, 5 nm, 10 nm, 15 nm, and 20 nm and second outer surface layers ($SiO_2$) of 0 nm, 2 nm, 5 nm, 10 nm, 15 nm, and 20 nm. Of these, no outer surface layer was formed where there is an indication of "0 nm."

The glass materials PF thus prepared were press molded in a press mold 7 comprising an upper mold 4 and a lower mold 5 which have a molding surface, and a sleeve mold 6 for keeping upper mold 4 and lower mold 5 concentric, as shown in FIG. 1. The details of the press molding conditions are given in the embodiments. However, pressing mold 7 and the glass material for press molding PF were heated and press molding was conducted at glass material PF viscosity settings of $10^6$ to $10^9$ dPa·s that were suited to press molding.

The "Evaluation results" given in Table 1 are the results of evaluation of the shape precision and external appearance of the press molded articles and the continuous moldability of the pressing mold when molding the glass material PF under identical press molding conditions. "A" means no problem in any category. "B" means that although there were no problems in some of the evaluation categories (such as shape precision), other evaluation items were poor (such as external appearance or continuous moldability). "C" means that neither shape precision, external appearance, or continuous moldability satisfied the standards.

In the above pressing test, the cases in which a glass material PF on which both a first outer surface layer and a second outer surface layer had been formed were press molded achieved better evaluation results than the cases in which a glass material PF on which either the first or second outer surface layer had not been formed were press molded. Further, the cases where both the first and second outer surface layers were 15 nm or lower in thickness tended to exhibit better evaluation results.

The glass material for press molding of the present invention was devised based on the results of the above press molding trials.

The core member of the configuration of the glass material of the present invention is comprised of an optical glass with a multiple component system. The optical glass with a multiple component system can, for example, be a glass comprising at least one readily reducing component from among W, Ti, Bi, and Nb. By press-molding the glass material of the present invention comprised of the optical glass as the core member, the present invention provides a high-quality optical glass element with a high refractive index, low dispersion, and precise shape.

Examples of glasses comprising at least one readily reducing component from among W, Ti, Bi, and Nb will be described below for optical glasses I and II.

<Optical Glass I>

The glass of core member 1 (optical glass I) employed in the glass material and optical glass element of the present invention will be described below. In the present invention, an optical glass with a multiple component system comprising any of $WO_3$, $TiO_2$, $Bi_2O_3$, and $Nb_2O_5$ can be employed as core member 1. In particular, when the total quantity comprised is 5 mole % or more (for example, 10 to 65, preferably 15 to 55 mole %), the method of the present invention is particularly useful. The glass of core member 1 desirably comprises 3 more % or more of $WO_3$. For example, when it comprises 4 to 15 mole %, the effect of the present invention is pronounced.

For example, optical glass I can be an optical glass comprising, denoted as mole percentages: 10 to 45% $P_2O_5$, 3 to 35% $Nb_2O_5$, 2 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; and 0 to 15% $SiO_2$; wherein the combined quantity of $WO_3$, $TiO_2$, $Bi_2O_3$, and $Nb_2O_5$ is not less than 10% but less than 65%, and 0 to 10% of F relative to the total quantity of oxygen.

The effect of the present invention is pronounced when optical glass I has a glass transition temperature Tg of 430° C. or higher, such as 450° C. or higher but not higher than 520° C. The effect of the present invention is also pronounced when the softening point of optical glass I is 530° C. or higher, such as 540° C. or higher but not higher than 600° C.

The above components will be specifically described below.

$P_2O_5$ is a glass network forming substance that imparts stability to the glass that permits manufacturing. When the content of $P_2O_5$ exceeds 45 mole %, weatherability deteriorates and maintaining a high refractive index tends to become difficult. At less than 10 mole %, the tendency of the glass to devitrify intensifies and the glass tends to become unstable. A range of 10 to 45 mole % is desirable, and a range of 15 to 35 mole % is preferred.

$Nb_2O_5$ imparts characteristics such as a high refractive index and high dispersion. When the quantity incorporated exceeds 35%, the glass transition temperature and the sag temperature rise, stability and high-temperature melting properties deteriorate, and foaming and coloration tend to occur during precision pressing. When the quantity introduced is less than 3%, the durability of the glass deteriorates and it becomes difficult to achieve the desired high refractive index. Thus, a range of 3 to 35% is desirable, and a range of 5 to 25% is preferred.

$Li_2O$ is an effective component for lowering the glass transition temperature. Compared to other alkalis, it has less of a tendency to lower the refractive index. At more than 35%, the stability of the glass deteriorates and devitrification tends to occur. Thus, the quantity incorporated desirably falls within a range of 0 to 35%, preferably within a range of 0 to 30%. When incorporated in a quantity of less than 2%, the transition temperature tends not to decrease. Thus, the quantity incorporated desirably falls within a range of 2 to 30%, preferably within a range of 3 to 25%.

$TiO_2$ imparts a high refractive index and high dispersion, and increases devitrification stability. When the quantity incorporated exceeds 25%, the devitrification stability and the transmittance of the glass tend to deteriorate, the sag temperature and the liquidus temperature tend to rise, and the glass tends to develop color during precision press molding. Thus, 0 to 25% is desirable and 0 to 15% is preferred.

$WO_3$ is an effective component in terms of imparting a high refractive index, high dispersion characteristics, and a low softening property. $WO_3$ functions to lower the glass transition temperature and sag temperature, and to raise the refractive index. When an excessive quantity of $WO_3$ is incorporated, such as the incorporation of more than 20%, the glass tends to develop color and the high temperature viscosity of the glass tends to decrease. Thus, the hot molding of spherical glass becomes difficult. Accordingly, the content is desirably 0 to 20%, preferably falling within a range of 0 to 15%, and more preferably, falling within a range of 0 to 10%.

To suppress the tendency of high refractive index glass to crystallize, $WO_3$ is desirably introduced in a proportion of 1 mole % or more, for example 2 mole % or more. The introduction of 2 to 10 mole % is advantageous.

$Bi_2O_3$, a substitute for lead, is a component that imparts a high refractive index and high dispersion. It has the effects of greatly expanding the production range of the glass and stabilizing the glass. Accordingly, the introduction of $Bi_2O_3$ permits vitrification even in glasses with low $P_2O_5$ contents. When the quantity introduced exceeds 40%, the glass tends to develop color. Thus, the content of $Bi_2O_3$ is desirably 0 to 40%, preferably 0 to 25%.

$B_2O_3$ is effective at enhancing the meltability of the glass and homogenizing the glass. At the same time, the incorporation of a small quantity changes the bond properties of OH within the glass, having the effect of suppressing foaming of the glass during precision press molding. When more than 20% of $B_2O_3$ is incorporated, the weatherability of the glass deteriorates and the glass tends to become unstable. Thus, 0 to 20% is desirable, and a range of 0 to 10% is preferred.

BaO is a component that has the effects of imparting a high refractive index, increasing devitrification stability, and lowering the liquidus temperature. When $WO_3$ is incorporated, particularly when $WO_3$ is incorporated in a large quantity, the introduction of BaO suppresses the development of color in the glass and has a considerable devitrification stabilizing effect. When the $P_2O_5$ content is low, the introduction of BaO has the effect of enhancing the weatherability of the glass. When the quantity of BaO that is introduced exceeds 25%, the glass becomes unstable and the transition temperature and sag temperature increase. Thus, BaO is desirably incorporated in a quantity of 0 to 25%, preferably 0 to 15%.

ZnO is a component that can be incorporated to raise the refractive index and dispersion of the glass. The incorporation of a small quantity of ZnO has the effects of lowering the glass transition temperature, the sag temperature, and the liquidus temperature. However, the introduction of an excessive amount results in pronounced deterioration of glass devitrification stability and presents a risk of raising the liquidus temperature. Accordingly, the quantity of ZnO incorporated is desirably 0 to 25%, preferably falling within a range of 0 to 15%, and more preferably, falling within a range of 0 to 10%.

$Na_2O$ and $K_2O$ are both components that can be incorporated to increase the resistance to devitrification of the glass, raise the glass transition temperature, sag temperature, and liquidus temperature, and enhance the meltability of the glass. However, when either $Na_2O$ or $K_2O$ exceeds 50%, or when the combined quantity of $Li_2O$, $Na_2O$, and $K_2O$ exceeds 55%, not only does the stability of the glass deteriorate, but there is a risk of the weatherability and durability of the glass deteriorating. Thus, the quantity of each of $Na_2O$ and $K_2O$ that is incorporated is 0 to 50%, desirably 0 to 20%, and the combined quantity of $Li_2O$, $Na_2O$, and $K_2O$ is desirably 0 to 55%. Preferred are 3 to 35% for $Na_2O$ and 0 to 10% for $K_2O$.

$Al_2O_3$ and $SiO_2$ are components that can be incorporated to adjust the stability and optical constants of the glass. However, these components also raise the glass transition temperature, and thus present a risk of compromising precision press moldability. They are each desirably kept to 15% or lower, preferably 0 to 10%.

MgO, CaO, and SrO are components that are incorporated to adjust the stability and weatherability of the glass. When incorporated in excessive quantities, the glass becomes unstable. Thus, they are each desirably incorporated in a quantity of 0 to 15%, preferably 0 to 10%.

$La_2O_3$, $Gd_2O_3$, $Yb_2O_3$, $ZrO_2$, and $Ta_2O_3$ are all components that can be incorporated to adjust the stability and optical constants of the glass. However, all of these components raise the glass transition temperature and thus present the risk of compromising precision press moldability. Accordingly, the quantity of each that is incorporated is desirably kept to 0 to 10%, preferably 0 to 8%.

To enhance the above properties while achieving the object of the present invention, the combined quantity of all of the above components and clarifying agents that are added desirably exceeds 95%, preferably exceeds 98%, more preferably exceeds 99%, and still more preferably, is 100%.

In addition to the above components, clarifying agents can be added in a ratio of 0 to 1 mass % based on the total content of the glass component. However, the addition of an excessive quantity of clarifying agent presents the risk of damaging the molding surfaces of the pressing mold, particularly the mold release film, during precision press molding. Thus, caution is warranted. Examples of clarifying agents are $Sb_2O_3$, $SnO_2$, $CeO_2$, $As_2O_3$ and the like. Out of concern for the impact on the environment, the use of $As_2O_3$ is to be avoided. $Sb_2O_3$ is desirably added in a quantity of 0 to 1 mass %. Although effective as a glass clarifying agent, when added in a quantity exceeding 1 mass %, $Sb_2O_3$ tends to cause foaming of the glass during press molding. Thus, the introduction of a quantity of 0 to 1 mass % is adequate. $SnO_2$ and $CeO_2$ can be simultaneously employed; the combined quantity thereof is desirably 0 to 2.5 mass %.

Other components such as $TeO_2$ and $Cs_2O$ can also be incorporated up to a combined quantity of 5% to the extent that the object of the present invention is not compromised. Since $TeO_2$ is toxic, it is desirably not employed out of concern for the environment. Similarly, $As_2O_3$, CdO, $Tl_2O$, radioactive substances, and compounds of Cr and Hg are also desirably not employed.

Because of its environmental impact, PbO is also not incorporated. Except for cases where color is being imparted to the glass to impart a light-absorbing function at a specific wavelength, Cu, Fe, Cd, and the like are also desirably not incorporated.

F is a component that is useful for lowering the Tg. However, when incorporated in excessive quantity, it volatizes from the melt in the course of molding the glass melt, causing striae and variation in constants. Accordingly, the quantity incorporated is 0 to 10 mole % relative to the total quantity of oxygen, desirably falling within a range of 0 to 5 mole %.

Optical glass I of the above core member has a refractive index nd of 1.7 or higher; an Abbé number vd of 35 or lower, preferably 30 or lower, and more preferably, 25 or lower; and the like. It affords high refraction and high dispersion, and is thus a high value-added glass that is put to wide use. However, the components (W, Ti, Bi, Nb) that are incorporated to achieve such useful optical constants tend to be reduced and are highly reactive during the press molding process. That is, they tend to react at elevated temperatures at the interface of the glass surface and the molding surface of the pressing mold. As a result, clouding, scratching, and other reaction traces occur on the surface of the molded article that is obtained, and fusion to the molding surface tends to occur. Thus, an optical element of inadequate performance in terms of external appearance tends to be obtained.

Since pressing is conducted with a compound outer surface layer provided on the outer surface of the glass material for press molding, the present invention provides an optical element having a core member of optical glass I of good external appearance performance that is free of defects such as surface cracking, clouding, and scratching.

<Optical Glass II>

The glass (optical glass II) of core member 1 that is employed in the glass material and optical glass element of the present invention will be described below.

In addition to incorporating at least one readily reducing component from among W, Ti, Bi, and Nb in the optical glass of core member 1 of the present invention, an optical glass comprising essential components in the form of $B_2O_3$, $La_2O_3$, and ZnO can also be adopted In optical glass II, $B_2O_3$ is a necessary component for constituting the glass network. $La_2O_3$ is an essential component for imparting a high refractive index and a low dispersion characteristic. When the two components are both present, the stability of the glass improves even more. ZnO is an essential component for imparting a low temperature softening property to the glass without lowering the refractive index.

By incorporating the above essential components in optical glass II, it is possible to impart optical characteristics in the form of a refractive index (nd) exceeding 1.7, desirably 1.8 or higher, and an Abbé number (vd) of 27 or higher, desirably 35 to 50. Specific examples are given below.

An optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 24% $TiO_2$; 0 to 20% $Bi_2O_3$; 0 to 15% $ZrO_2$; 0 to 20% $Ta_2O_5$; and 0 to 10% $GeO_2$; wherein the combined quantity of $WO_3$, $TiO_2$, $Bi_2O_3$, and $Nb_2O_5$ is 0.1 to 25%; and 0 to 10% of F relative to the total quantity of oxygen When the transition point Tg in optical glass II is 530° C. or higher, for example, 560° C. or higher but not higher than 630° C., the effect of the present invention is pronounced. The effect of the present invention is also pronounced when the softening point is 640° C. or higher, for example, 650° C. or higher but not higher than 720° C.

The various components of the above optical glass will be described.

$SiO_2$ functions to enhance the stability of the glass, but raises the glass transition temperature and lowers the refractive index when incorporated in excessive quantity. Accordingly, the quantity incorporated is set to 0 to 50%, desirably 0 to 40%, preferably 1 to 20%, and more preferably, 4 to 15%.

$B_2O_3$ is an essential component for network formation. However, when incorporated in excessive quantity, it lowers the refractive index (nd). It is thus incorporated in a proportion of 5 to 70%, desirably 10 to 65%, and preferably, 20 to 55%.

$Li_2O$ has a major effect in lowering the glass transition temperature. However, when incorporated in excessive quantity, it lowers the refractive index and reduces glass stability. Accordingly, the quantity of $Li_2O$ is desirably 0 to 20%, preferably 0 to 15%. None can be incorporated at all. $Na_2O$ and $K_2O$ function to enhance meltability, but lower the refractive index and diminish stability when incorporated in excessive quantities. Thus, each is incorporated in a quantity of 0 to 10%, desirably 0 to 8%, and preferably 0 to 6%. They can be not incorporated at all.

ZnO is an essential component that maintains a high refractive index while imparting a low softening property. However, it lowers the stability of the glass when incorporated in excessive quantity. The quantity incorporated is thus 1 to 50%, desirably 3 to 45%, and preferably, 10 to 40%.

CaO, SrO, and MgO also function to improve meltability. However, they lower the refractive index and diminish glass stability when incorporated in excessive quantity. They are thus each incorporated in a quantity of 0 to 10%, desirably 0 to 8%, and preferably, 0 to 5%. BaO functions to raise the refractive index, but when incorporated in excessive quantity, diminishes the stability of the glass. The quantity incorporated is thus 0 to 10%, desirably 0 to 8%, and preferably, 0 to 5%.

$La_2O_3$ is an essential component imparting a high refractive index and a low dispersion characteristic. However, it lowers the stability of the glass when incorporated in excessive quantity. Thus, it is incorporated in a quantity of 5 to 30%, desirably 7 to 25%, and preferably 9 to 18%.

$Gd_2O_3$ is a component that imparts a low dispersion characteristic. However, it diminishes the stability of the glass when incorporated in excessive quantity. It is thus incorporated in a quantity of 0 to 22%. When $Gd_2O$ and $La_2O_3$ are both present, an effect is achieved whereby the glass stability is increased relative to when only one of the two is incorporated. The quantity incorporated is desirably 0 to 20%, preferably 1 to 10%.

$Yb_2O_3$ is an optional component employed to raise the refractive index and lower dispersion. When incorporated in a small quantity, it increases the stability and chemical durability of the glass. However, when incorporated in excessive quantity, the stability of the glass relative to devitrification is greatly compromised, and the glass transition temperature and sag temperature increase. Thus, the quantity incorporated is 0 to 10%, desirably 0 to 8%.

$Nb_2O_5$ is also a component that raises the refractive index. However, when incorporated in excessive quantity, it diminishes the stability of the glass and raises the liquidus temperature. Thus, it is incorporated in a quantity of 0 to 15%, desirably 0 to 13%, and preferably, 0 to 7%.

$WO_3$ functions to raises the refractive index and increase the stability of the glass. However, when incorporated in excessive quantity, it diminishes the stability of the glass and discolors the glass. Accordingly, $WO_3$ is incorporated in a quantity of 0 to 20%, desirably 0 to 18%, and preferably, 1 to 13%.

$TiO_2$ is also a component that raises the refractive index. However, when incorporated in excessive quantity, it diminishes the stability of the glass and discolors the glass. It is thus incorporated in a quantity of 0 to 24%, desirably 0 to 20%, and preferably, 0 to 15%.

$Bi_2O_3$ functions to raise the refractive index and enhance the stability of the glass. However, when incorporated in excessive quantity, it imparts color to the glass and produces a problem in the form of corrosion of melting vessels made of platinum. Thus, the quantity incorporated is 0 to 20%, desirably 0 to 10%, and preferably, 0 to 5%.

To raise the refractive index, the combined quantity of $WO_3$, $TiO_2$, $Nb_2O_5$, and $Bi_2O_3$ desirably is 0.1 to 25%, preferably 1 to 20%, ore preferably 3 to 15%.

When attempting to achieve a higher refractive index while satisfying the various conditions required of a glass with an Abbé number (vd) falling below 27, the molar ratio of the quantity of $B_2O_3$ to the combined quantity of $B_2O_3$ and $SiO_2$ $(B_2O_3/(B_2O_3+SiO_2))$ is desirably 0.50 to 1.00, preferably 0.60 to 0.95.

$ZrO_2$ functions to increase the refractive resistance. However, when incorporated in excessive quantity, it diminishes the stability of the glass and increases the liquidus temperature. Thus, it is incorporated in a quantity of 0 to 15%, desirably 0 to 12%, and preferably, 1 to 6%.

To raise the refractive index while maintaining glass stability, the combined content of $WO_3$, $Ta_2O_5$, $Nb_2O_5$, $TiO_2$, and $ZrO_2$ is desirably 2 to 40 mole %, preferably 5 to 35 mole %.

$Ta_2O_5$ is an optional component used to raise the refractive index and lower dispersion. The incorporation of a small quantity of $Ta_2O_5$ has the effect of improving stability with respect to devitrification and high temperature viscosity without lowering the refractive index of the glass. However, when the quantity incorporated exceeds 20%, the liquidus temperature rises sharply and dispersion increases. Thus, the quantity incorporated is 0 to 20%, desirably 0 to 17%.

$GeO_2$ is an optional component that functions to raise the refractive index of the glass and increase the stability of the glass. The quantity incorporated is 0 to 10%, desirably 0 to 8%. However, it is more expensive than other components by a factor of 10, and is thus preferably not incorporated.

To enhance the above properties while achieving the object of the present invention, the combined quantity of all of the above components and clarifying agents that are added desirably exceeds 95%, preferably exceeds 98%, more preferably exceeds 99%, and still more preferably, is 100%.

In addition to the above components, clarifying agents can be added in a ratio of 0 to 1 mass % based on the total content of the glass component. However, the addition of an excessive quantity of clarifying agent presents the risk of damaging the molding surfaces of the pressing mold, particularly the mold release film, during precision press molding. Thus, caution is warranted. Examples of clarifying agents are $Sb_2O_3$, $SnO_2$, $CeO_2$, and $As_2O_3$. Out of concern for the impact on the environment, the use of $As_2O_3$ is to be avoided. $Sb_2O_3$ is desirably added in a quantity of 0 to 1 mass %. $SnO_2$ and $CeO_2$ can be simultaneously employed; the combined quantity thereof is desirably 0 to 2.5 mass %.

F is a component that is useful for lowering the Tg. However, when incorporated in excessive quantity, it volatizes from the melt in the course of molding the glass melt, causing striae and variation in constants. Accordingly, the quantity incorporated is 0 to 10 mole % relative to the total quantity of oxygen, desirably falling within a range of 0 to 5 mole %.

Because of its environmental impact and the fact that it is reduced during precision press molding in non-oxidizing atmospheres, adhering to the molding surfaces of the pressing mold, PbO is also not incorporated. Except for cases where color is being imparted to the glass to impart a light-absorbing function at a specific wavelength, Cu, Fe, Cd, Ni, Cr and the like are also desirably not employed.

The shape of the core member of the glass material of the present invention is substantially identical to the shape of the glass material of the present invention because the compound outer surface layer covering the position that is to become an optically functional surface of the core member is around several ten nm, desirably not greater than 30 nm, preferably not greater than 20 nm, more preferably not greater than 10 nm in thickness.

<The Compound Outer Surface Layer>

The glass material for press molding of the present invention comprises a compound outer surface layer covering at least an area of the core member that becomes an optically functional surface. The compound outer surface layer comprises a first outer surface layer covering the core member and a second outer surface layer covering the first outer surface layer.

The first outer surface layer is comprised of components that do not react with the glass of the core member and diffuse into the glass of the core member at press molding temperatures. In other words, the components that do not react with the glass of the core member and do not diffuse into the glass of the core member at press molding temperatures are components that cannot be incorporated into the glass of the core member. The term "press molding temperatures" means the temperatures at which the glass material PF for press molding is press molded in the pressing mold, which are temperatures corresponding to a viscosity of the glass material PF of $10^5$ to $10^{10}$ dPa·s.

The first outer surface layer comprises either one or more metal oxides selected from among $ZrO_2$, $Y_2O_3$, $Sc_2O_3$, and $Ln_2O_3$ (lanthanide series oxides) or a noble metal. Examples of lanthanide series oxides are $La_2O_3$, $Ce_2O$, $Pr_2O_3$, $Sm_2O_3$, $Yb_2O_3$ and the like. Examples of noble metals are Pt, Au and the like. Specifying these components of the first outer surface layer adequately suppresses the migration of readily reducing components from the core member to the outer surface side, thus reliably avoiding contact between the core member and the pressing mold.

The first outer surface layer can be 1 nm or more but not more than 15 nm in thickness, and is desirably 2 nm or more but not more than 10 nm in thickness. Setting the thickness of the first outer surface layer to this range suppresses the migration of easily reducing components from the core member to the outer surface side and prevents cracking and clouding of the first outer surface layer itself.

The second outer surface layer comprises components that enhance moldability during press molding. Examples of such components are one or more from among carbon (C) and an oxide, fluoride, or nitride of silicon (Si), aluminum (Al), zinc (Zn), tin (Sn), hafnium (Hf), boron (B), or magnesium (Mg). Examples of oxides of silicon (Si), aluminum (Al), zinc (Zn), tin (Sn), hafnium (Hf), boron (B), or magnesium (Mg) are $SiO_2$, $Al_2O_3$, ZnO, SnO, $SnO_2$, $HfO_2$, $B_2O_3$, MgO and the like. Examples of fluorides of silicon (Si), aluminum (Al), zinc (Zn), tin (Sn), hafnium (Hf), boron (B), or magnesium (Mg) are $SiF_4$, $AlF_3$, $ZnF_2$, $SnF_2$, $SnF_4$, $HfF_4$, $BF_3$, $MgF_2$ and the like. Examples of nitrides of silicon (Si), aluminum (Al), zinc (Zn), tin (Sn), hafnium (Hf), boron (B), or magnesium (Mg) are $Si_3N_4$, AlN, $Zn_3N_2$, $Sn_3N_2$, $Sn_3N_4$, HfN, BN, $MgN_2$ and the like.

Of these, $SiO_2$ is preferred because as a second outer surface layer, it has a higher softening point than the softening point of the optical glass of the multiple component system that constitutes the core member and tends not to undergo an interface reaction with the pressing mold, that is, it is of high moldability.

Establishing the above components for the second outer surface layer further enhances moldability during press molding and permits smooth molding. The term "moldability" is a characteristic relating to smoothness and durability in the course of heating and softening an optical glass and press molding it with a pressing mold. The longer press molding can be continuously conducted, the greater the "moldability."

The second outer surface layer is, for example, 1 nm or more but not more than 15 nm in thickness, desirably 2 nm or more but not more than 10 nm, in thickness. Setting the thickness of the second outer surface layer to the above range enhances the moldability during press molding and prevents cracking and clouding of the second outer surface layer itself.

The glass material of the present invention desirably has a shape similar to the press molded article (molded glass article that is molded by press molding) of the same surface shape and center thickness as the targeted optical glass element.

According to the present invention, press molding is conducted with a glass material (also referred to as a "similarly shaped glass material" hereinafter) with a shape that is similar to the molded glass article that is obtained by press molding. Thus, the rate of change in shape of the glass material during press molding is reduced, and as a result, the amount of extension of the outer surface layer is reduced. Consequently, the loss of function by the outer surface layer due to excessive thinning of the outer surface layer, cracking, and the like is suppressed.

The shape that is similar to the molded glass article is desirably one such that the rate of change of the center thickness due to press molding to obtain an optical glass element is 50% or less and the rate of change of the outside diameter is 50% or less.

When employing a similarly shaped glass material such that the change rate of the center thickness due to press molding is 50% or less and the change rate of the outside diameter is 50% or less, it is possible to readily manufacture an optical element affording high-quality optical performance without the occurrence of outer surface cracking, clouding, scratching, or the like.

Here, the term rate of change is a ratio indicating how much the dimensions change following press molding relative to the dimensions prior to press molding, and can be calculated using the following computation equation (equation 1):

Rate of change (%)=|1−(dimension following press molding)/dimension prior to press molding)|× 100

That is, the rate of change of the center thickness can be obtained from equation 2:

Rate of change of center thickness=|1−(center thickness of press molded article/center thickness of glass material)|×100

For example, for a center thickness of the glass material prior to press molding of 2.0 mm and a center thickness of the press molded article following pressing of 1.0 mm, equation 2 gives a rate of change in the center thickness of 50%.

The rate of change in the outside diameter can be calculated using equation 3:

Rate of change of outside diameter=|1−(outside diameter of press molded article/outside diameter of glass material)|×100

For example, for an outside diameter dimension of the glass material prior to press molding of 10.0 mm and an outside diameter dimension of the press molded article after pressing of 15.0 mm, equation 3 gives a range of change in outside diameter of 50%.

By limiting the similarly shaped glass material to a rate of change in center thickness when press molded of 50% or less and the rate of change of the outside diameter to 50% or less, as the amount of deformation of the glass material decreases, the amount of deformation of the surface layer decreases, and cracks do not occur in the compound outer surface layer.

The rate of change in the center thickness is desirably 40% or less, preferably 35% or less, and more preferably, 30% or less. However, when the rate of change of the center thickness is less than 1%, gas sometimes collects between the main surface of the similarly shaped glass material and the molding surface of the pressing mold and the surface precision of the press molded article sometimes deteriorates. Accordingly, the rate of change of the center thickness is 1% or more, desirably 5% or more. A desirable range of the rate of change in the center thickness is 5 to 40%, preferably 10 to 35%.

The rate of change of the outside diameter is desirably 30% or less, preferably 25% or less, and more preferably, 15% or less. However, when the rate of change of the outside diameter is less than 1%, gas sometimes collects between the main surface of the similarly shaped glass material and the molding surface of the pressing mold and the surface precision of the press molded article sometimes deteriorates. Accordingly, the rate of change of the outside diameter is 1% or more, desirably 3% or more. A desirable range of the rate of change in the center thickness is 3 to 30%, preferably 5 to 25%.

Figure 2:
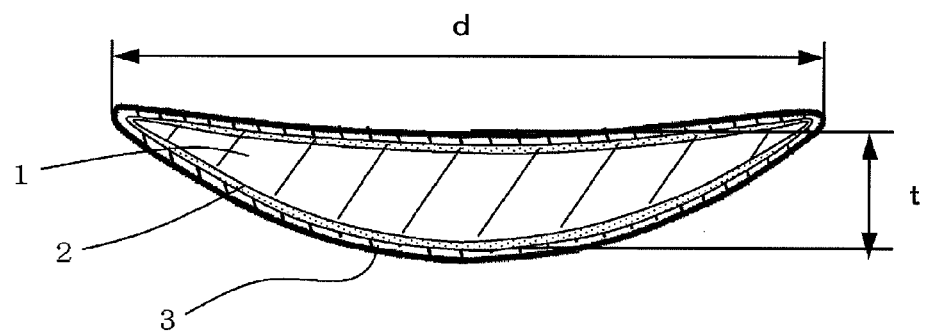
FIG. 2 A sectional view showing a mode of the glass element for press molding of the present invention.

FIG. 2 is a sectional view of the glass material of the present invention. The glass material is a similarly shaped glass material that has been preformed to be similar to the molded glass article serving as the base for obtaining the final optical element. In FIG. 2, the letter d denotes the outer shape of the glass material and the letter t denotes the center thickness. The glass material is comprised of a core member 1 comprising the optical glass with a multiple component system such as optical glass I or optical glass II, and a first outer surface layer 2 and a second outer surface layer 3 covering the surface of core member 1.

Figure 3:
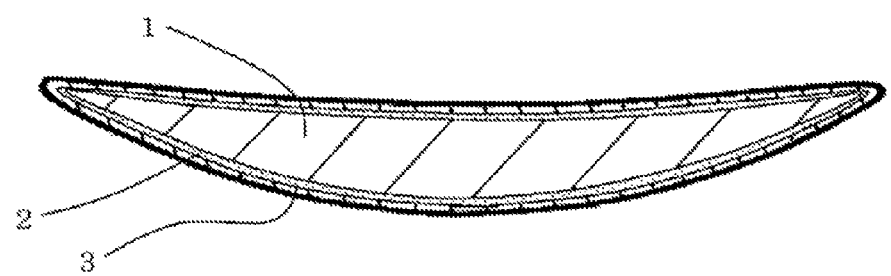
FIG. 3 A sectional view of a molded glass article that has been press molded using the glass material for press molding shown in FIG. 2.

FIG. 3 is a sectional view of the molded glass article obtained by press molding the glass material of FIG. 2. Press molding causes the center thickness t to be smaller than that of the glass material and outside diameter d to be larger than that of the glass material. A first outer surface layer 2 and a second outer surface layer 3 has been formed over the entire surface of the press molded article.

Preforming of the core member of the glass material of the present invention will be described next. The glass material of the present invention can be fabricated by using glass serving as core member 1 that has been preformed to a prescribed volume and shape. In this preforming, for example, a piece is cut from a block-shaped piece of optical glass, ground, and polished to preform it to a prescribed volume and shape. Alternatively, an optical glass melt can be dripped from a pipe, or separated while flowing down, to obtain a glass gob, and the glass gob can be preshaped while cooling. Here, the method of receiving the glass melt in receiving molds into which gas is being blown from beneath, and cooling and preforming the glass melts while they are in an substantially floating state can be adopted. This method is desirable because it affords good productivity and produces a glass material with a smooth surface.

The glass material of the present invention desirably has a shape similar to the molded glass article obtained by press molding. The core member 1 of the similarly shaped glass material is also desirably preformed to a shape similar to the molded glass article before it is coated with outer surface layer 2.

The core member 1 of the similarly shaped glass material can be molded by the following method, for example.

A glass melt is caused to flow out of a pipe and a glass melt gob is separated. While the glass melt gob that has been obtained is being supported by a lower mold having a lower mold molding surface, the upper surface of the glass melt is pressed by an upper mold having an upper mold molding surface of prescribed shape, and the glass is cooled while maintaining this state. Thus, the glass is molded to the shape of the molding surface of the upper and lower molds, and the core member 1 of the similarly shaped glass material is formed.

In addition to the above method, it is also possible for a glass material that has been molded in advance into a spherical shape or oblate spherical shape to be softened by reheating, and for the softened glass material to be molded into a shape similar to the targeted molded glass article using a pressing mold. Still further, it is possible for a block-shaped or plate-shaped glass material to be ground or polished to form the core member 1 of a similarly shaped glass material.

To obtain an optical glass element in the form of a meniscus lens, the similarly shaped glass material and its core member 1 desirably have a shape with a convex surface on one side and a concave or planar surface on the other side, with a concave surface on the other side being preferred. When molding a similarly shaped glass material and core member 1 with such a shape, in the pressing mold for molding the glass melt gob or softened glass material by the above method, the lower mold can have a concave molding surface and the upper mold can have a convex or planar molding surface. Press molding and cooling can be conducted as set forth above to form a similarly shaped glass material and its core member 1 of prescribed shape.

When obtaining an optical glass element in the form of a biconvex lens, the similarly shaped glass material and its core member 1 desirably have two surfaces that are convex in shape. Such a similarly shaped glass member and its core member 1 can be formed by employing a pressing mold in which both the lower mold and upper mold have concave molding surfaces to conduct press molding and cooling.

In the present invention, the surface of a preformed member comprised of optical glass with a multiple component system serving as a preformed core member 1 as set forth above is coated with a compound outer surface layer of a first outer surface layer 2 and a second outer surface layer 3. A known film-forming method such as sputtering or vacuum vapor deposition can be employed as the coating method of these layers. For example, first outer surface layer 2 and second outer surface layer 3 can be formed one by one on core member 1 by the sputtering method employing the target material comprised of material forming each surface layer and argon gas.

The following method can be employed as a specific film-forming method for first outer surface layer 2. Multiple pieces of core glass (core member 1) that have been formed into prescribed shape are arranged on a tray and the tray is placed in a vacuum chamber. The interior of the vacuum chamber is evacuated to generate a vacuum while heating the core glass to about 300° C. with a heater. Once the interior of the vacuum chamber has been evacuated to the point where a degree of vacuum of $1\times10^{-5}$ Torr or less has been produced, Ar gas is introduced, the target material (Zr, Y or the like) within the vacuum chamber is subjected to a high frequency, the starting material is converted to a plasma, and an first outer surface layer 2 is formed on the surface of the core glass. The thickness of first outer surface layer 2 can be controlled as desired by adjusting the pressure (degree of vacuum) within the vacuum chamber, the power supply, and the film forming time.

Second outer surface layer 3 can be formed by the same method as first outer surface layer 2. A target material in the form of quartz glass, or silicon, aluminum, zinc, tin, hafnium, boron, or magnesium, either alone or in oxide, nitride, or fluoride form, can be employed.

When press molding the glass material PF to mold an optical element, it suffices for the area of core member 1 that becomes the optically functional surface of the optical element to be covered by first outer surface layer 2 and second outer surface layer 3. The term "optically functional surface" means an area within the effective diameter of the optical lens, for example.

A film containing carbon can be present on the surface (that is, the area beyond first outer surface layer 2 and second outer surface layer 3) of the glass material PF of the present invention. This imparts adequate smoothness to the pressing mold when the glass material is fed to the pressing mold before pressing, allows the glass material to smoothly migrate to a prescribed position (center position) of the pressing mold, and allows the surface of the glass material to extend as the glass deforms when the glass material softens and deforms due to pressing, aiding extension of the glass material along the surface of the pressing mold. This is also useful to facilitate separation of the glass from the surface of the pressing mold and mold release when the pressed article is cooled to a prescribed temperature after pressing.

The carbon-containing film is desirably mainly comprised of carbon. It can contain components other than carbon, such as in a hydrocarbon film. A known film forming method, such as vacuum vapor deposition, sputtering, ion plating, plasma treatment, and ion gun treatment employing a carbon starting material, can be employed as the film-forming method. The film can also be formed by thermal decomposition of a carbon-containing material such as a hydrocarbon.

[The Method for Manufacturing an Optical Glass Element]

The present invention includes a method for manufacturing an optical glass element by heat softening a glass material PF that has been preformed to a prescribed shape and conducting press molding using pressing mold 7 as shown in FIG. 1. The above-described glass material of the present invention is employed in the method for manufacturing an optical glass element.

The method for manufacturing an optical glass element of the present invention permits the manufacturing of an optical element affording high-quality optical performance without the occurrence of surface cracking, clouding, scratching, or the like and without producing a reaction due to contact between core member 1 and pressing mold 7.

The press molding method will be described. A pressing mold 7 that has been obtained by precisely processing a close material having adequate heat resistance and rigidity can be employed in press molding. Examples are silicon carbide, silicon nitride, tungsten carbide, aluminum oxide, titanium carbide, stainless steel, and other metals, as well as these same materials with surfaces that have been coated with films of carbon, heat-resistant metals, noble metal alloys, carbide, nitride, boride compounds, or the like.

A carbon-containing film is desirable from the perspective of being able to mold the glass material of the present invention having first outer surface layer 2 and second outer surface layer 3 into an optical glass element free of fusion, clouding, scratching, and the like. A carbon-containing film that is comprised of amorphous and/or crystalline, graphite and/or diamond, a single component layer or a composite layer, is desirably employed. The carbon film can be formed by sputtering, plasma CVD, CVD, ion plating, or the like. For example, the film can be formed by sputtering employing an inert gas such as Ar as the sputtering gas and graphite as the sputtering target. Alternatively, the film can be formed by microwave plasma CVD using methane gas as the starting material gas. When forming the film by the ion plating method, benzene gas can be ionized for use. These carbon films include those having C—H bonds.

Providing a carbon-containing mold release film on the molding surface of the pressing mold or forming a carbon-containing film on the surface of the glass material has a certain effect in preventing fusion. In such cases, to prevent oxidation of the carbon during press molding, it is desirable to conduct pressing in a non-oxidizing atmosphere. However, the above readily reducing components tend to reduce under a non-oxidizing atmosphere. Thus, there is a problem in that interface reactions tend to take place between the glass and the carbon. Since a glass material is employed in the present invention in which the glass of the core member is surface coated with first outer surface layer 2 and second outer surface layer 3, for example, an advantage is afforded in that the interface reaction between the glass and carbon can be suppressed even when pressing is conducted in a non-oxidizing atmosphere such as nitrogen gas.

Employing a pressing mold having a carbon-containing mold release film on the molding surfaces thereof is advantageous in terms of enhancing the sliding property between the molding surface and the glass material and further improving moldability.

Press molding can be conducted by the following methods, for example.

In press molding, as shown in FIG. 1, a glass material PF is fed into a pressing mold 7 comprising an upper mold 4, a lower mold 5, and a sleeve mold 6 and heated to within a temperature range suited to pressing. For example, the heating temperature is suitably set based on the optical glass of core member 1. However, press molding is desirably conducted within a temperature range at which the viscosity of the glass material PF becomes $10^5$ to $10^{10}$ dPa·s. The pressing temperature desirably corresponds to a viscosity of $10^6$ to $10^8$ dPa·s including $10^{7.2}$ dPa·s of the optical glass constituting core member 1, for example. Making the temperature corresponding to a viscosity of around $10^{7.2}$ dPa·s of core member 1 800° C. or lower, desirably 750° C. or lower, and more preferably, 650° C. or lower serves as a selection index for the glass. In particular, it is suitable to set the above press molding temperature condition in a manner taking into account the fact that the glass material of the present invention having a first outer surface layer 2 and a second outer surface layer 3 is employed in the present invention, the fact that the melting point of the compound outer surface layer is higher than that of the glass of the core member, and the fact that the compound outer surface layer deforms to a certain degree during press molding (which is relatively easy because it is extremely thin).

The glass material PF can be fed into pressing mold 7 and both glass material PF and pressing mold 7 heated to the above temperature range, or glass material PF and pressing mold 7 can be separately heated to the above temperature range and glass material PF positioned within pressing mold 7. A method in which glass material PF is heated to a temperature corresponding to a viscosity of $10^5$ to $10^9$ dPa·s, pressing mold 7 is separately heated to a temperature corresponding to a glass viscosity of $10^9$ to $10^{12}$ dPa·s, glass material PF is positioned in pressing mold 7, and press molding is immediately conducted can also be employed. This is desirable in that effects are achieved in that the pressing mold temperature can be relatively low, the cycle time for heating/cooling the molding apparatus can be shortened, and deterioration of pressing mold 7 due to heating can be suppressed. In either case, cooling is begun at the start of press molding or after it has started, and the molding surface and glass element are kept in close contact while a suitable load application schedule is applied and the temperature is lowered. Subsequently, the molds are released and the molded article is removed. The mold release temperature is desirably one that corresponds to a viscosity of $10^{12.5}$ to $10^{13.5}$ dPa·s.

[The Optical Glass Element]

The present invention includes an optical glass element that is manufactured by press molding the glass material PF of the present invention.

The core member is characterized by comprising an optical glass comprising at least one readily reducing component selected from among W, Ti, Bi, and Nb, and not comprising Pb;

in that the compound outer surface layer comprises a first outer surface layer covering the core member and a second outer surface layer covering the first outer surface layer;

in that the first outer surface layer is comprised of components that do not react with the glass of the core member and do not diffuse into the glass of the core member at press molding temperatures; and in that the second outer surface layer is comprised of components that enhance moldability during press molding.

The optical glass element of the present invention permits the manufacturing of an optical element affording high-quality optical performance without the occurrence of surface cracking, clouding, scratching, and the like in the press molding process by eliminating the occurrence of a reaction due to contact between the core member and the pressing mold by conducting molding with a compound outer surface layer comprised of a first outer surface layer and a second outer surface layer positioned between the core member and the pressing mold, and by conducting smooth molding resulting from the first outer surface layer blocking migration of readily reducing components from the core member to the outer surface side and the second outer surface layer enhancing moldability during press molding.

By employing optical glasses I and II as the core member, the present invention provides a high-quality optical glass element with a high refractive index, low dispersion, and precise shape.

The composition of the core member and surface compound layer comprised of optical glass that constitute the optical glass element of the present invention are identical to the glass material of the present invention. The thickness of the compound outer surface layer substantially does not change due to press molding. This tendency is particularly pronounced when the glass material is of a shape similar to that of the molded glass article that is obtained by press molding, particularly when the shape is such that the rate of change of the center thickness due to press molding is 50% or less and the rate of change of the outside diameter is 50% or less. The thermal expansion coefficient of the surface layer is lower than that of the core glass and its glass transition temperature is higher than that of the core glass (it has less of a tendency to thermally deform at the pressing temperature (tends not to extend)). Thus, even when the glass material PF at ordinary temperature is heated to the pressing temperature, press molded, and then cooled to ordinary temperature following press molding, the thickness of the compound outer surface layer does not change from the glass material to the optical glass element following press molding.

When $SiO_2$ film exists as a second outer surface layer, since a $SiO_2$ film, albeit thin, is present on the surface of the optical glass element of the present invention, the $SiO_2$ content is high. Thus, the optical glass element has the characteristic of good chemical durability and suppressed reflective rate in comparison with a glass optical element without the second outer surface layer. When $Al_2O_3$, $AlF_3$, $MgF_2$ or the like is present as the second outer surface layer in place of $SiO_2$ film, similarly, enhanced chemical durability is advantageously obtained.

An optically functional film such as an antireflective film can be formed on the surface of the optical glass element of the present invention. In that case, a single layer or laminated layers of materials such as $Al_2O_3$, $ZrO_2$—$TiO_2$, and $MgF_2$ can be suitably formed on the molded article in which the outer surface layer is present to obtain a desired antireflective film. The antireflective film can be formed by a known method such as vapor deposition, ion-assisted vapor deposition, ion plating, or sputtering. The thickness of the antireflective film is thicker than the compound outer surface layer of the present invention, and ranges from 50 nm to 500 nm, for example.

For example, in the case of vapor deposition, a vapor deposition apparatus is used to heat a vapor deposition material with an electron beam, the direct passage of electricity, or an arc in a vacuum atmosphere of around $10^{-4}$ Torr, and vapor from the material that has been generated by evaporation and sublimation is transmitted to the substrate, where it condenses and precipitates to form an antireflective film. The substrate can be heated to a temperature of from room temperature to about 400° C. However, when the glass transition temperature (Tg) of the substrate is 450° C. or lower, the upper limit heating temperature of the substrate can be set to Tg−50° C.

The optical glass element of the present invention comprises a second outer surface layer comprised principally of $SiO_2$, $Al_2O_3$, $AlF_3$, and $MgF_2$. The second outer surface layer is highly compatible with antireflective films. Thus, antireflective films tend not to peel off. Since the second outer surface layer present in the optical glass element is relatively thin in the present invention, an antireflective film can be applied without nonuniformity. When the thickness of the compound outer surface layer becomes too large, an optical glass element to be obtained by press molding a glass material with such a thick compound outer surface layer causes surface cracking and if an antireflective layer is provided, the cracking becomes apparent, resulting in reduction of transparency of the optical glass element. Thus, the thickness of the first outer surface layer and second outer surface layer of the compound outer surface layer is desirably within the above mentioned range.

Figure 4:
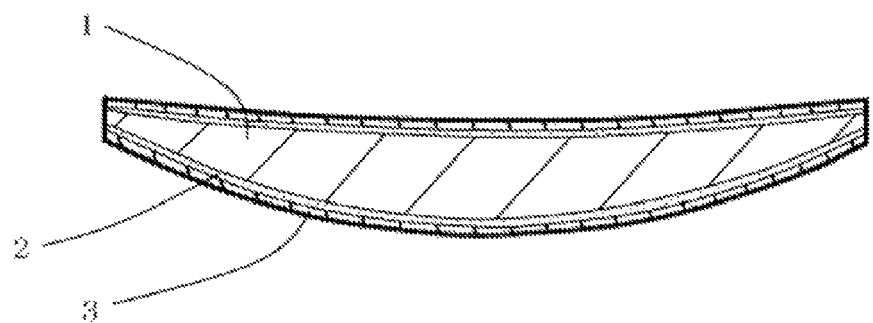
FIG. 4 A sectional view of an optical glass element obtained from the molded glass article shown in FIG. 3.

FIG. 4 shows a sectional view of the optical glass element of the present invention. The targeted optical element shown in FIG. 4 was obtained by edge processing (grinding) the peripheral portion of the molded glass article shown in FIG. 3. Compound surface layer (first outer surface layer 2 and second outer surface layer 3) has also been removed from the peripheral edge surface that has been edge processed and ground. The shape of the optical glass element of the present invention is not limited. It can applied to various shapes, such as convex meniscus lenses, concave meniscus lenses, biconvex lenses, and biconcave lenses.

The optical glass element of the present invention can be employed as small-diameter, thin, lightweight lenses such as the lenses used in small image pickup systems that are installed in portable image pickup devices, communication lenses, optical pickup object lenses, and collimator lenses.

EMBODIMENTS

The present invention will be described in detail below through embodiments.

Embodiments 1 to 6

The six types of optical glass falling under optical glass I in Table 2 were employed as the optical glasses serving as core member 1 of glass material PF. A first outer surface layer 2 comprised of $ZrO_2$ of varying thickness was applied to the surfaces thereof, and a second outer surface layer 3 comprised of $SiO_2$ of varying thickness was formed on the surfaces thereof to prepare multiple glass materials PF. These were then used to mold the glass lens of convex meniscus shape with a lens diameter of 18 mm and a center thickness of 2.65 mm shown in FIG. 4. $ZrO_2$ constituted 99.5% of the components of first outer surface layer 2 (remainder impurities) and $SiO_2$ constituted 99.8 mass % of the components of the second outer surface layer (remainder impurities).

First, the optical glass I that was to become core member 1 was caused to drip onto receiving molds in a molten state, cooled, and preformed into glass gobs with a shape consisting of a convex surface on one side and a concave surface on the reverse side, as shown in FIG. 2. Films of $ZrO_2$ of prescribed thickness (2 nm, 3 nm, 5 nm, 10 nm, 15 nm) were formed on the preformed glass gobs by sputtering employ a Zr target, after which second outer surface layers 3 were formed to prescribed thickness (2 nm, 3 nm, 5 nm, 10 nm, 15 nm) on the surfaces thereof by sputtering using a quartz glass ($SiO_2$) target to obtain glass materials PF for press molding. The prescribed thickness was a value estimated from the sputtering conditions. The glass material PF had a shape similar to the molded glass article (see FIG. 3) shown in FIG. 2. The outside diameter dimension d was 17.6 mm and the center thickness t was 3.24 mm.

nm, 10 nm, or 15 nm was formed on the core glass, and a second outer surface layer 3 of 2 nm, 3 nm, 5 nm, 10 nm, or 15 nm was formed thereover to obtain a glass material PF (that is, patterns 7 to 10, 13 to 16, 19 to 22, and 25 to 28 in Table 1). The glass material PF was then press molded to obtain a molded article. On the surface of the each of the molded articles, the compound outer surface layer 2 remaining on the surface exhibited a good surface state free of surface defects such as cracking and scratching. Even when 300 shots of press molding were continuously conducted, no pullout or fusion occurred on the molding surfaces of the pressing mold. The shape precision, eccentricity precision, and external appearance of the press molded articles were all within specifications.

TABLE 2

| | Embodiment | | | | | |
|---|---|---|---|---|---|---|
| Unit | 1 mol % | 2 mol % | 3 mol % | 4 mol % | 5 mol % | 6 mol % |
| B2O3 | 2.00 | 2.00 | 6.00 | 6.00 | 3.40 | 4.70 |
| P2O5 | 25.50 | 25.50 | 24.00 | 24.00 | 23.70 | 27.10 |
| Al2O3 | 0 | 0 | 0 | 0 | 0 | 1.80 |
| Li2O | 6.00 | 16.00 | 20.50 | 20.00 | 19.20 | 9.80 |
| Na2O | 10.50 | 10.50 | 12.00 | 13.00 | 11.20 | 29.10 |
| K2O | 2.00 | 2.00 | 2.00 | 2.00 | 2.00 | 0 |
| BaO | 1.00 | 1.00 | 1.00 | 2.00 | 7.90 | 0 |
| ZnO | 0 | 0 | 1.00 | 2.00 | 2.90 | 4.70 |
| TiO2 | 7.00 | 7.00 | 5.50 | 5.00 | 5.90 | 5.70 |
| Nb2O3 | 18.00 | 18.00 | 19.00 | 18.00 | 16.20 | 10.10 |
| WO3 | 8.00 | 8.00 | 5.00 | 5.00 | 7.60 | 5.80 |
| Bi2O3 | 20.00 | 10.00 | 4.00 | 3.00 | 0 | 0 |
| Ti + Nb + W + Bi | 53.00 | 43.00 | 33.50 | 31.00 | 29.70 | 21.60 |
| Total | 100 | 100 | 100 | 100 | 100 | 100 |
| Refractive index | 2.0031 | 1.9208 | 1.84976 | 1.82732 | 1.80558 | 1.6875 |
| Abbé number | 19.1 | 20.8 | 22.96 | 23.92 | 25.46 | 31.40 |
| Tg(° C.) | 488 | 471 | 455 | 450 | 466 | 455 |
| Ts (° C.) | 537 | 522 | 507 | 503 | 517 | 500 |

In the table, Tg denotes the glass transition temperature and Ts denotes the sag temperature.

Next, the glass material PF was press molded in a nitrogen gas atmosphere with a press molding apparatus. That is, a press mold comprised of upper and lower molds of SiC with molding surfaces on which a carbon-containing mold release film had been formed by sputtering and a sleeve mold was employed. The atmosphere within the chamber of the molding apparatus was backfilled with non-oxidizing $N_2$ gas, the glass material was heated to a temperature corresponding to a core glass viscosity of $10^{7.2}$ dPa·s, and the glass material was fed into the pressing mold that had been heated to a temperature corresponding to a core glass viscosity of $10^{8.5}$ dPa·s. The glass material was then pressed between the upper and lower molds immediately after having been introduced, the glass was cooled to a temperature below the cooling temperature of the core glass while maintaining the glass in tight contact with the upper and lower molds, and the molded article (optical lens) was removed from the pressing mold. The sectional shape of the molded article is shown in FIG. 3. The outside diameter dimension d was 21.5 mm and the center thickness was 2.65 mm. That is, the rate of change in the outside diameter of the pressing mold was 22.2%, and the rate of change in the center thickness was 18.2%. Next, the peripheral portion of the press molded article was edge processed by grinding, yielding a convex meniscus aspherical glass lens 18 mm in diameter.

Optical glass falling under optical glass I was employed as the core glass. A first outer surface layer 2 of 2 nm, 3 nm, 5

As comparative examples, glass materials on which the second outer surface layer was directly formed on the core glass without applying a first outer surface layer 2 (patterns 1 to 5 in Table 1), glass materials in which only first outer surface layer 2 was formed on the surface of the core glass (patterns 6, 12, 18, 24, 30 in Table 1), glass materials in which a second outer surface layer was formed to a thickness of 20 nm over the first outer surface layer (patterns 11, 17, 23, 29 in Table 1), and glass materials in which a first outer surface layer was formed to a thickness of 20 nm followed by the formation of a second outer surface layer thereover (patterns 31 to 35 in Table 1) were all press molded as glass materials PF under the same press molding conditions as in the above embodiments.

In the great majority of the molded articles, the surface of the molded article following press molding exhibited surface defects such as cracking and scratching in compound outer surface layer 2 remaining on the surface, presenting a surface state that precluded use as an optical element.

In particular, when the glass material was press molded without having formed a second outer surface layer, clouding and defective shapes were observed during press molding from the outset. When press molding was conducted with glass materials that had been coated with a first outer surface layer and a second outer surface layer which were both 20 nm or more in thickness, cracking and scratching occurred on the surface of the press molded article and the yield was extremely low.

Embodiments 7 to 18

The 12 types of optical glasses falling under optical glass II that are listed in Table 3 were employed as the optical glass of core member 1 in glass material PF. The surfaces thereof were coated with a first outer surface layer 2 comprising $ZrO_2$ and a second outer surface layer 3 comprising $SiO_2$ to prepare glass materials PF. These were molded to obtain convex meniscus shaped glass lenses 16 mm in lens diameter.

First, the optical glass II that was to become core member 1 was caused to drip onto receiving molds in a molten state, cooled, and preformed into glass gobs with a shape consisting of a convex surface on one side and a concave surface on the reverse side in the same manner as in Embodiments 1 to 6. First outer surface layers when then formed using Zr as a sputtering target, and second outer surface layers 3 were formed to prescribed thickness on the surfaces thereof using a quartz glass ($SiO_2$) sputtering target to obtain glass materials PF for press molding. The prescribed thicknesses were values estimated from the sputtering conditions. The glass materials PF had a shape similar to the molded glass article (see FIG. 3) shown in FIG. 2. The outside diameter dimension d was 15.6 mm and the center thickness t was 2.20 mm.

The glass material PF was then press molded in the same manner as in Embodiments 1 to 6 using a press molding apparatus. The sectional shape of the molded articles is shown in FIG. 3. The outside diameter dimension d was 18.2 mm and the center thickness was 1.98 mm. That is, the rate of change in the outside diameter due to press molding was 16.7% and the rate of change in the center thickness was 10.0%. Next, the peripheral portion of the press molded articles was edge processed by grinding, yielding convex meniscus aspherical glass lenses 16 mm in diameter.

The compound outer surface layer remaining on the outer surface of the molded articles after press molding exhibited a good surface state in all of the molded articles, with no surface defects such as cracking or scratching being found. Further, even when 200 shots of press molding were continuously conducted, no pullout or fusion occurred on the molding surfaces of the pressing mold. The shape precision, eccentricity precision, and external appearance of the press molded articles were all within specifications.

TABLE 3

| | | | Embodiment | | | |
|---|---|---|---|---|---|---|
| Unit | 7 mol % | 8 mol % | 9 mol % | 10 mol % | 11 mol % | 12 mol % |
| $SiO_2$ | 13.82 | 11.48 | 5.06 | 6.40 | 7.81 | 6.27 |
| $B_2O_3$ | 33.85 | 39.87 | 43.04 | 37.60 | 35.39 | 35.13 |
| $Li_2O$ | 5.49 | 5.54 | 2.53 | 4.80 | 3.14 | 5.18 |
| ZnO | 10.51 | 20.12 | 17.72 | 22.4 | 31.72 | 31.37 |
| $La_2O_3$ | 17.74 | 9.52 | 13.50 | 13.6 | 12.24 | 12.39 |
| $Gd_2O_3$ | 6.14 | 7.39 | 6.33 | 0 | 0 | 0 |
| $ZrO_2$ | 7.37 | 4.02 | 5.06 | 4.80 | 3.81 | 2.82 |
| $Ta_2O_5$ | 6.19 | 1.81 | 3.38 | 0 | 1.06 | 2.90 |
| $TiO_2$ | 0 | 0 | 0 | 4.80 | 0 | 0 |
| $Nb_2O_3$ | 1.13 | 0 | 0 | 4.00 | 2.3 | 1.25 |
| $WO_3$ | 0.97 | 0.25 | 3.38 | 1.60 | 2.53 | 2.67 |
| $Bi_2O_3$ | 0 | 0 | 0 | 0 | 0 | 0 |
| $Sb_2O_3$ | 0 | 0 | 0 | 0 | 0 | 0.02 |
| Total | 100 | 100 | 100 | 100 | 100 | 100 |
| Refractive index | 1.85415 | 1.77325 | 1.82225 | 1.83390 | 1.80650 | 1.80921 |
| Abbé number | 39.91 | 47.33 | 42.78 | 37.24 | 40.6 | 40.91 |
| Tg(° C.) | 622 | 569 | 593 | 546 | 545 | 547 |
| Ts (° C.) | 663 | 615 | 640 | 598 | 580 | 589 |

| | | | Embodiment | | | |
|---|---|---|---|---|---|---|
| Unit | 13 mol % | 14 mol % | 15 mol % | 16 mol % | 17 mol % | 18 mol % |
| $SiO_2$ | 14.49 | 6.36 | 7.69 | 7.63 | 7.63 | 7.51 |
| $B_2O_3$ | 21.74 | 34.18 | 29.23 | 29.01 | 29.01 | 28.57 |
| $Li_2O$ | 5.8 | 0 | 0.77 | 0 | 0 | 0 |
| ZnO | 15.94 | 28.14 | 24.62 | 26.72 | 27.48 | 27.07 |
| $La_2O_3$ | 14.49 | 14.63 | 16.15 | 16.03 | 15.27 | 15.04 |
| $Gd_2O_3$ | 0 | 4.05 | 3.85 | 3.82 | 4.58 | 4.51 |
| $ZrO_2$ | 4.35 | 4.45 | 4.62 | 3.82 | 3.05 | 6.02 |
| $Ta_2O_5$ | 0 | 4.69 | 3.85 | 3.82 | 3.82 | 2.26 |
| $TiO_2$ | 20.29 | 0 | 1.54 | 1.53 | 0 | 3.20 |
| $Nb_2O_3$ | 2.9 | 0 | 0 | 0 | 0 | 0 |
| $WO_3$ | 0 | 3.50 | 7.69 | 7.63 | 9.16 | 4.15 |
| $Bi_2O_3$ | 0 | 0 | 0 | 0 | 0 | 1.32 |
| $Sb_2O_3$ | 0 | 0 | 0 | 0 | 0 | 0 |
| Total | 100 | 100 | 100 | 100 | 100 | 100 |
| Refractive index | 1.91949 | 1.8517 | 1.88297 | 1.88122 | 1.87770 | 1.88159 |
| Abbé number | 30.01 | 40.2 | 37.01 | 36.96 | 37.2 | 37.2 |
| Tg(° C.) | 564 | 604 | 608 | 615 | 605 | 605 |
| Ts (° C.) | 619 | 650 | 650 | 658 | 653 | 653 |

INDUSTRIAL APPLICABILITY

The present invention is useful in the field of manufacturing optical glass elements.

KEY TO THE NUMBERS

1 Core member
2 First outer surface layer
3 Second outer surface layer
4 Upper mold
5 Lower mold
6 Sleeve mold
7 Pressing mold
PF Glass material for press molding
d Outside diameter dimension
t Center thickness

The invention claimed is:

1. A press molded optical glass element, characterized in that:
   a glass material for press molding comprises a core member comprised of an optical glass with a multiple component system and a compound outer surface layer covering at least an area of the core member that becomes an optically functional surface;
   the core member is comprised of an optical glass comprising at least one readily reducing component from among W, Ti, Bi, and Nb and not comprising Pb;
   the compound outer surface layer comprises a first outer surface layer covering the core member and a second outer surface layer covering the first outer surface layer;
   the first outer surface layer consists of $ZrO_2$, or $Sc_2O_3$ and is not less than 1 nm but not more than 15 nm in thickness; and
   the second outer surface layer comprises one or more members of an oxide, fluoride, or nitride of silicon (Si), aluminum (Al), zinc (Zn), tin (Sn), hafnium (Hf), boron (B) or magnesium (Mg) and is not less than 1 nm but not more than 15 nm in thickness.

2. The optical glass element according to claim 1, characterized in that the core member is an optical glass comprising, denoted as mole percentages: 10 to 45% $P_2O_5$, 3 to 35% $Nb_2O_5$, 0 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; 0 to 15% $SiO_2$; wherein the combined quantity of $WO_3$, $TiO_2$, $Bi_2O_3$, and $Nb_2O_5$ is not less than 10% but less than 65%, and 0 to 10% of F relative to the total quantity of oxygen.

3. The optical glass element according to claim 1, characterized in that the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 24% $TiO_2$; 0 to 20% $Bi_2O_3$; 0 to 15% $ZrO_2$; 0 to 20% $Ta_2O_5$; and 0 to 10% $GeO_2$; wherein the combined quantity of $WO_3$, $TiO_2$, $Bi_2O_3$, and $Nb_2O_5$ is 0.1 to 25%; and 0 to 10% of F relative to the total quantity of oxygen.

* * * * *